United States Patent
Wang et al.

(10) Patent No.: US 9,091,322 B2
(45) Date of Patent: Jul. 28, 2015

(54) GENERATOR SET MOUNT

(71) Applicant: Cummins Power Generation, Inc., Minneapolis, MN (US)

(72) Inventors: Edward J. Wang, Shoreview, MN (US); Brian D. Tjenstrom, Victoria, MN (US); Gregory P. Peterson, Maple Grove, MN (US); Steve N. Seidlitz, Sunfish Lake, MN (US); Gary Sandlass, Maple Plain, MN (US); Jeffrey G. Anderson, Anoka, MN (US); SzeKwan Cheah, Saint Paul, MN (US)

(73) Assignee: CUMMINS POWER GENERATION, INC., Minneapolis, MN (US)

( * ) Notice: Subject to any disclaimer, the term of this patent is extended or adjusted under 35 U.S.C. 154(b) by 26 days.

(21) Appl. No.: 13/666,460

(22) Filed: Nov. 1, 2012

(65) Prior Publication Data

US 2013/0106114 A1    May 2, 2013

Related U.S. Application Data

(60) Provisional application No. 61/554,443, filed on Nov. 1, 2011.

(51) Int. Cl.
| | |
|---|---|
| F02B 63/04 | (2006.01) |
| H02K 7/18 | (2006.01) |
| F16F 15/04 | (2006.01) |
| F16M 5/00 | (2006.01) |
| F16F 15/06 | (2006.01) |
| F16M 13/00 | (2006.01) |
| F16F 5/00 | (2006.01) |
| B62D 23/00 | (2006.01) |

(52) U.S. Cl.
CPC ............... *F16F 15/04* (2013.01); *F02B 63/042* (2013.01); *F16F 15/06* (2013.01); *F16M 5/00* (2013.01); *Y10T 29/49002* (2015.01)

(58) Field of Classification Search
USPC .............. 290/1 A; 248/634, 635; 267/140.13, 267/140.4, 294; 296/35.1
See application file for complete search history.

(56) References Cited

U.S. PATENT DOCUMENTS

| | | | | | |
|---|---|---|---|---|---|
| 2,562,195 | A | * | 7/1951 | Lee ........................... | 267/140.13 |
| 3,250,565 | A | * | 5/1966 | Jaskowiak ................... | 296/35.1 |
| 3,266,139 | A | * | 8/1966 | Adams ........................... | 29/509 |
| 3,319,691 | A | | 5/1967 | Fisher .............................. | 411/96 |
| 3,756,551 | A | * | 9/1973 | Bishop ....................... | 267/141.1 |
| 3,809,427 | A | * | 5/1974 | Bennett ........................ | 296/35.1 |
| 3,888,450 | A | * | 6/1975 | Seilenbinder ............ | 267/140.13 |
| 3,927,730 | A | * | 12/1975 | Winslow ....................... | 180/271 |
| 4,286,777 | A | * | 9/1981 | Brown ........................... | 267/294 |

(Continued)

OTHER PUBLICATIONS

International Search Report and Written Opinion, International Application No. PCT/US2012/063019, Date of Mailing: Feb. 1, 2013, 11 pages.

*Primary Examiner* — Pedro J Cuevas
(74) *Attorney, Agent, or Firm* — Foley & Lardner LLP

(57) ABSTRACT

A system and apparatus for a slip joint mount is disclosed to accommodate thermal expansion of a generator set on a base. One embodiment includes an electric generator driven by a prime mover and an equipment mount coupled to the prime mover. A base includes a mounting aperture and means for retaining the equipment mount to the mounting aperture. Also disclosed is means for allowing for movement of the equipment mount with respect to the mounting aperture due to thermal expansion of a portion of the prime mover.

47 Claims, 6 Drawing Sheets

(56) References Cited

U.S. PATENT DOCUMENTS

| | | | | |
|---|---|---|---|---|
| 4,373,696 A | | 2/1983 | Dochterman | 248/604 |
| 4,391,436 A | * | 7/1983 | Fishbaugh | 267/141.1 |
| 4,597,258 A | | 7/1986 | Harris | 60/796 |
| 4,871,150 A | * | 10/1989 | Salver et al. | 267/140.13 |
| 4,921,203 A | * | 5/1990 | Peterson et al. | 248/635 |
| 4,976,114 A | | 12/1990 | Manning | 62/323.1 |
| 4,995,598 A | | 2/1991 | Ingham | 267/293 |
| 5,096,153 A | * | 3/1992 | Seeley et al. | 248/635 |
| 5,110,081 A | * | 5/1992 | Lang, Jr. | 248/635 |
| 5,295,671 A | * | 3/1994 | Nakagaki et al. | 267/140.13 |
| 5,318,282 A | * | 6/1994 | Schaefer | 267/136 |
| 5,405,118 A | * | 4/1995 | Dietz et al. | 248/632 |
| 5,409,283 A | * | 4/1995 | Ban | 296/35.1 |
| 5,551,661 A | * | 9/1996 | Bunker | 248/634 |
| 5,580,028 A | * | 12/1996 | Tomczak et al. | 248/634 |
| 5,641,153 A | * | 6/1997 | Gwinn | 267/294 |
| 5,676,356 A | | 10/1997 | Ekonen et al. | 267/294 |
| 5,704,598 A | * | 1/1998 | Kojima | 267/140.13 |
| 5,718,407 A | * | 2/1998 | Lee | 248/634 |
| 5,743,509 A | * | 4/1998 | Kanda et al. | 248/635 |
| 5,842,677 A | * | 12/1998 | Sweeney et al. | 248/635 |
| 5,957,427 A | * | 9/1999 | Hanson | 248/635 |
| 5,965,949 A | * | 10/1999 | Fukuda et al. | 290/1 A |
| 6,158,724 A | * | 12/2000 | Takashima et al. | 267/140.13 |
| 6,354,558 B1 | * | 3/2002 | Li | 248/615 |
| 6,416,030 B1 | | 7/2002 | Bergdahl et al. | 248/635 |
| 6,499,770 B1 | * | 12/2002 | Glista et al. | 285/223 |
| 6,505,822 B1 | * | 1/2003 | Yamamoto et al. | 267/140.13 |
| 6,601,392 B2 | | 8/2003 | Child | 60/772 |
| 6,820,908 B1 | | 11/2004 | Tousi et al. | 296/35.1 |
| 6,910,683 B2 | * | 6/2005 | Itoh et al. | 267/140.13 |
| 6,952,056 B2 | * | 10/2005 | Brandenburg et al. | 290/1 A |
| 7,082,896 B2 | | 8/2006 | Allen et al. | 123/2 |
| 7,637,076 B2 | | 12/2009 | Vaughn | 52/838 |
| 8,226,066 B2 | * | 7/2012 | Kubat et al. | 248/634 |
| 8,434,749 B2 | * | 5/2013 | Rogge et al. | 267/293 |
| 8,485,491 B2 | * | 7/2013 | Visage et al. | 248/638 |
| 8,485,506 B2 | * | 7/2013 | Matsuda | 267/140.13 |
| 8,511,656 B2 | * | 8/2013 | Yahata | 267/141.4 |
| 8,621,873 B2 | * | 1/2014 | Robertson et al. | 60/796 |
| 2005/0151374 A1 | * | 7/2005 | Ambrose | 290/1 A |
| 2007/0182078 A1 | | 8/2007 | Leonardi et al. | 267/175 |
| 2007/0267870 A1 | * | 11/2007 | Ambrose | 290/1 A |
| 2009/0103996 A1 | | 4/2009 | Menon | 411/104 |
| 2009/0131208 A1 | | 5/2009 | Hawryluck et al. | 474/133 |
| 2009/0283402 A1 | | 11/2009 | Osman | 204/230.8 |
| 2010/0034616 A1 | | 2/2010 | Johnson | 411/395 |
| 2011/0204651 A1 | * | 8/2011 | Nishimura et al. | 290/1 A |
| 2011/0272952 A1 | * | 11/2011 | Richardson et al. | 290/1 A |
| 2013/0106113 A1 | * | 5/2013 | Wang et al. | 290/1 A |

\* cited by examiner

GENERATOR SET MOUNT

CROSS-REFERENCE TO RELATED APPLICATIONS

The present application claims the benefit of the filing date of Provisional Application Ser. No. 61/554,443, filed on Nov. 1, 2011, which is incorporated herein by reference.

BACKGROUND

The present application relates to mechanical mounting, and more particularly, but not exclusively, to mounting a generator set to a base.

In most applications, during normal operation, the engine and its supporting skid will have different temperatures. In some applications, it is occasionally desirable to fabricate power generation equipment from components of dissimilar materials that have different thermal coefficients of expansion—such as iron and steel. When these components are mounted together, routine startup and shutdown thermal cycling can induce unwanted mechanical stress cycles that may lead to failure of the mount and/or other components. Such failures can lead to increased vibration levels and even more catastrophic failures.

Moreover, for a base (such as a skid) to have sufficient strength and rigidity, it is often made out of hollow support beam members, typically in the form of rectangular steel tubes (RSS). Rigidly attach an engine or generator to such structure frequently involves application of a bolt and a threaded nut or similar fastening device. To apply sufficient assembly torque to this bolt/nut arrangement, either the bolt or nut is rigidly attached to the inside of the member (by welding or the like), or sufficient access (such as a large access hole) is provided to facilitate application of a constraining device (such as a wrench) to the bolt or nut to prevent its rotation during assembly. Both of these approaches may add cost and increase assembly time. Further, if one fastening component is rigidly attached by welding, failure of the component may be very expensive to fix.

Thus, there is an acute need for further contributions in this area of technology.

SUMMARY

One embodiment of the present invention is a unique mounting technique for a generator set. Other embodiments include apparatuses, systems, devices, methods, and combinations for mounting a device to a base/chassis that accounts for thermal expansion differentials. Further embodiments, forms, objects, features, advantages, aspects, and benefits shall become apparent from the following description and drawings.

BRIEF DESCRIPTION OF THE DRAWING

The description herein makes reference to the accompanying figures wherein like reference numerals refer to like parts throughout the several views, and wherein.

DETAILED DESCRIPTION OF REPRESENTATIVE EMBODIMENTS

Figure 1A:
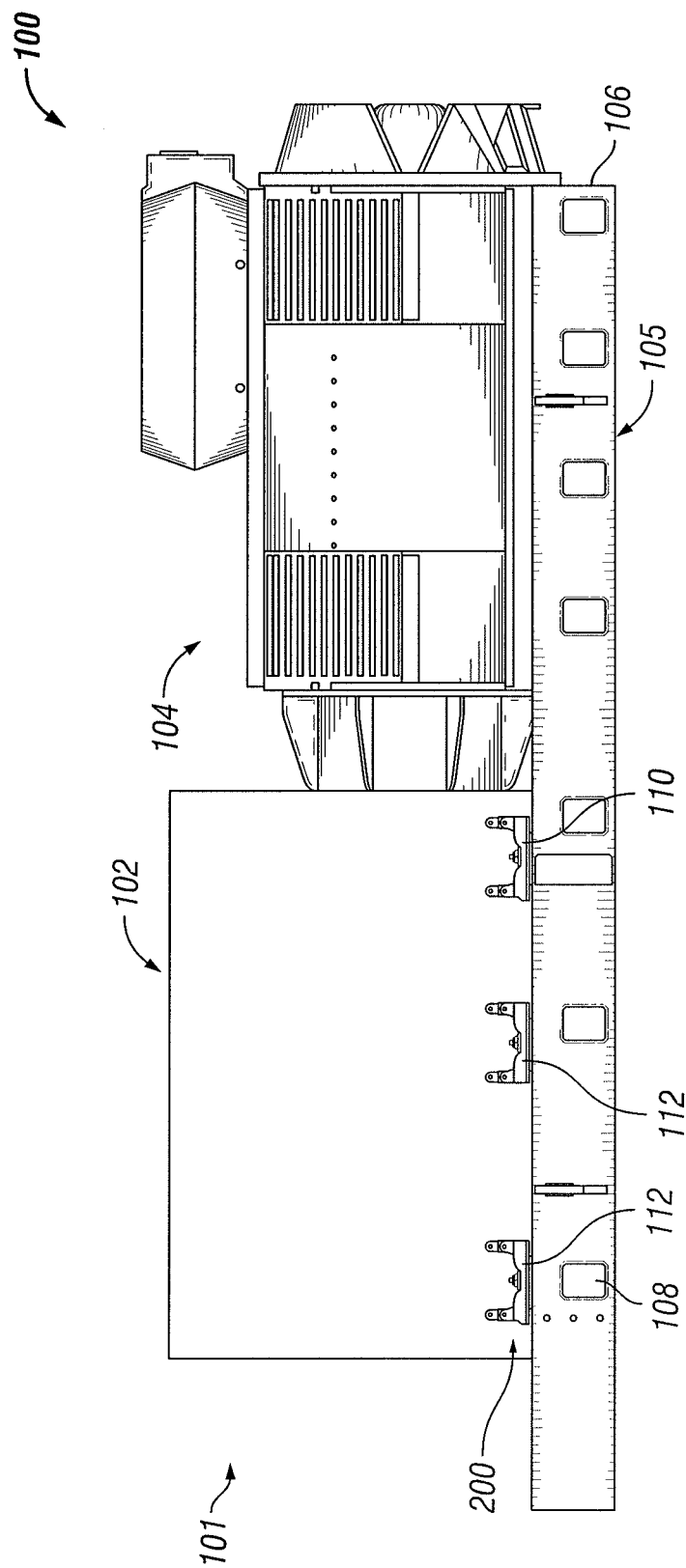
FIGS. 1A and 1B are side views of electric power generation equipment attached to a base (in the form of a skid) with a plurality of mounts.

For purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the illustrated devices, and any further applications of the principles of the invention as illustrated therein being contemplated as would normally occur to one skilled in the art to which the invention relates.

Figure 1B:
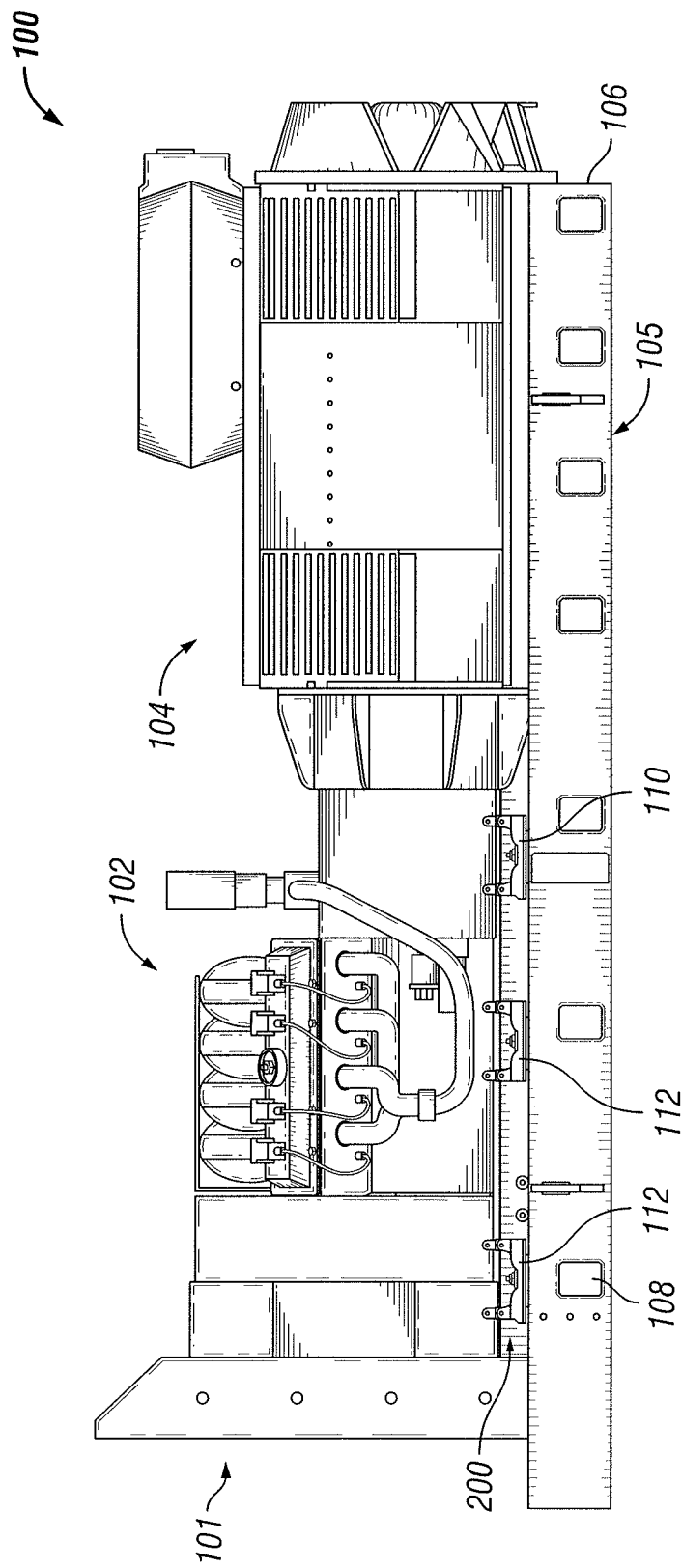

FIG. 1A is a side view of electric power generation equipment 100 including a generator set 101 attached to a chassis or base 105 in the form of a skid 106 through a plurality of mounts 110 and 112. Generator set 101 includes an electric power generator 104 driven by a prime mover 102, which in one non-limiting form may be an internal combustion engine. Prime mover 102 can take a variety of forms including, but not limited to, reciprocating engines, rotary engines, gasoline engines, and gas turbine engines. In one particular embodiment, prime mover 102 is a diesel-fueled reciprocating piston type of internal combustion engine, such as shown in FIG. 1B. In a further form, the prime mover 102 is a reciprocating piston engine having a displacement of 60 liters or more. However, it is contemplated that any size and/or type of prime mover 102 which can drive the generator 104 can be utilized. As used herein, the term generator 104 can be any device that converts mechanical energy to electrical energy which includes, but is not limited to, an alternator, dynamo, or other rotating electromagnetic generator, and any other driven device.

The prime mover 102 is mounted to the side rail of skid 106. A second side rail (not shown) of skid 106 is located on the opposite side of prime mover 102. The prime mover 102 is secured to the skid 106 through a plurality of mounts 110, 112 in a manner such that the mounts 110, 112 and/or the prime mover 102 will not be damaged or destroyed by thermal expansion of the prime mover 102. As the temperature of the prime mover 102 increases from ambient to operating temperature, it tends to increase in length due to thermal expansion. The slip joint mounts 112 provide for and allow this thermal expansion to occur without damaging fixed mounts 110 or the slip joint mounts 112.

In one embodiment of the present application, the mounts nearest the generator 104, are fixed mounts 110 while those mounts farther away from the generator 104 (and generally closest to prime mover 102) are slip joint mounts 112. While FIG. 1 depicts a fixed joint mount 110 and two slip joint mounts 112 each engaged to prime mover 102 and a side rail of skid 106, it is contemplated that any number of slip joint mounts 112 and/or fixed mounts 110 can be utilized.

In certain embodiments, the prime mover 102 is made of a material having a first coefficient of thermal expansion and the skid 106 is constructed of a material having a second coefficient of thermal expansion, the first coefficient and second coefficient differing. In further embodiments, it is contemplated that the prime mover 102 and the skid 106 can be constructed of a material(s) having the same coefficient of expansion, however, even if the prime mover 102 and the skid 106 are constructed of the same material, heat may not be transferred equally and the prime mover 102 can expand faster and more than the skid 106. In one specific, but non-limiting embodiment, the prime mover 102 is made of cast iron and the skid 106 is made of plate steel, which have different coefficients of thermal expansion.

Figure 2:
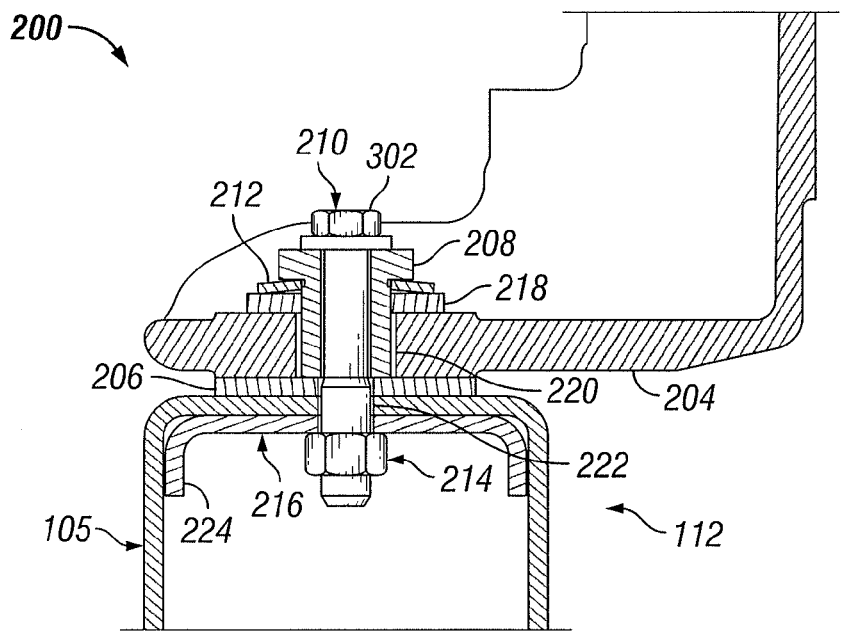
FIG. 2 is a partial cut-away view of a slip joint mount of FIG. 1.

The illustrative embodiment in FIG. 2 depicts a cut away view of slip joint assembly 200 including a slip joint mount 112 which restricts movement of the prime mover 102 relative to the base 105. Referencing FIG. 2, the slip joint mount 112 can include a shim 206 positioned between an equipment mount 204 having a first mounting aperture 220, and the base 105 having a second mounting aperture 222. A sleeve 208 can extend through at least a portion of the first mounting aperture 220. A fastening member 210, in the form of a bolt in the illustrated embodiment, includes a retention plate 302, or head, at a first end portion and a retaining member 214, in the form of a nut in the illustrated embodiment, on a second end portion opposite the first end portion. The fastening member 210 extends through the sleeve 208, the shim 206, and a portion of the base 105. The clearance is formed by aperture 220 to allow for slip between sleeve 208 and equipment mount 204, thus providing a slip mount 112. A compression spring 212 is positioned between the retention plate 302 and the equipment mount 204, with the fastening member 210 extending through compression spring 212, sleeve 208, equipment mount 204 and retention plate 302. In the case of the engine type of prime mover 102, equipment mount 204 may be a standard engine mount, such as a weldnut. A retention assembly 216 can be attached to the retaining member 214 to receive the second end portion of the fastening member 210.

In some embodiments, the first mounting aperture 220 is located in equipment mount 204 (an "engine mount" in the case of the engine form of prime mover 102). The equipment mount 204 can be fastened to the prime mover 102 or can be integrally formed to a portion of thereof, including, but not limited to an engine block in the case of a internal combustion engine form of prime mover 102. The equipment mount 204 can be constructed in any fashion such that the equipment mount 204 is secured to the prime mover 102 and includes the first mounting aperture 220 to receive fastening member 210 to secure the prime mover 102 to the base 105.

Figure 4:
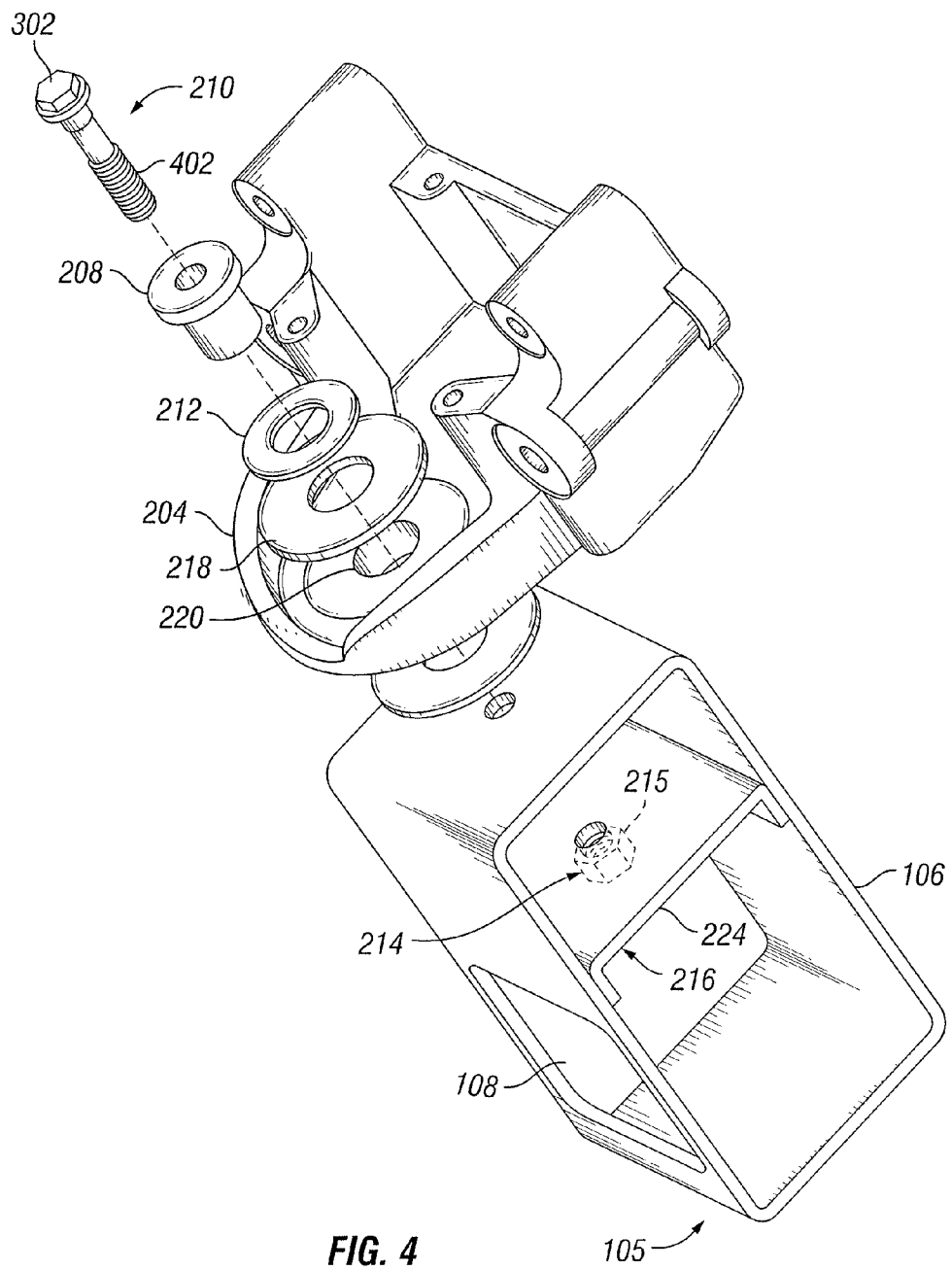
FIG. 4 is an exploded perspective view of the slip joint mount of FIG. 2.

Turning to the embodiment of FIG. 4, the fastening member 210 includes retention plate 302 at a first end and a retainer 402 at a second end. The fastening member 210 can be any fastening device which is capable of extending through the first mounting aperture 220 and the second mounting aperture 222 to secure the prime mover 102 to the base 105. The fastening member 210 fastens equipment mount 204 to the base 105. It is contemplated that the fastening member 210 can permanently or semi-permanently fasten the equipment mount 204 to the base 105. Fastening member 210 can also be disengaged from base 105 to allow maintenance or modification of slip joint mount 112, or removal of prime mover 102 from base 105. In the depicted embodiment, the fastening member 210 is a bolt, the retention plate 302 is a bolt flange head, and the retainer 402 includes a plurality of threads structured to engage threading of retention assembly 216. However, it is contemplated that the fastening member 210, the retention plate 302, and the retainer 402 can be any device and/or combination of devices which permits for the application and/or retention of an adequate amount of torque to the slip joint mount 112. In one embodiment, the retainer 402 is secured to a retaining member 214 in the form of a nut, however, any retaining member 214 may be utilized which is capable of securing and/or tightening the fastening member 210, including, but not limited to, a cotter pin, a press fit, a rivet, or other fastening member.

The first mounting aperture 220 and/or the second mounting aperture 222 can be sized to accommodate movement of the fastening member 210. In one embodiment, the first mounting aperture 220 is sized to house a sleeve 208. The sleeve 208 can be a friction bearing, a bushing, journal bearing, collar, and/or any other device which eases movement, radial and/or axial depending upon the application, of the fastening member 210. In certain embodiments, the sleeve 208 is a T-shaped bushing wherein the T-shaped top of the bushing is located between the retention plate 302 and a compression spring 212. In further embodiments, it is contemplated that the sleeve 208 can be integrally formed with and/or coated on the fastening member 210, e.g. as a polymeric coating to provide lubricated movement to the fastening member 210.

Referring to FIG. 2, the compression spring 212 is illustrated as a Belleville washer, cone-shaped disc spring, or a conical spring washer. However, other spring types are not precluded. For example, the compression spring 212 can be a helical spring, a spring washer, a volute spring, leaf spring, wave washer and/or any other type of compression spring which allows an adequate preloading to be applied to the entire slip joint mount 112 to prevent joint slip or opening due to static and dynamic loads under any operating conditions, while providing a friction force that is less than the permissive force from thermal expansion. This allows slip joint mount 112 to slip under thermal expansion loading by overcoming the friction force of the preload applied through compression spring 212, thereby allowing the equipment mount 204 to move laterally relative to the base 105 and prevent excessive thermal growth induced strains from occurring in equipment mounts 204 and/or base 105. Furthermore, compression spring 212 allows slip joint mount 112 to tolerate axial motion without wearing out.

Figure 3:
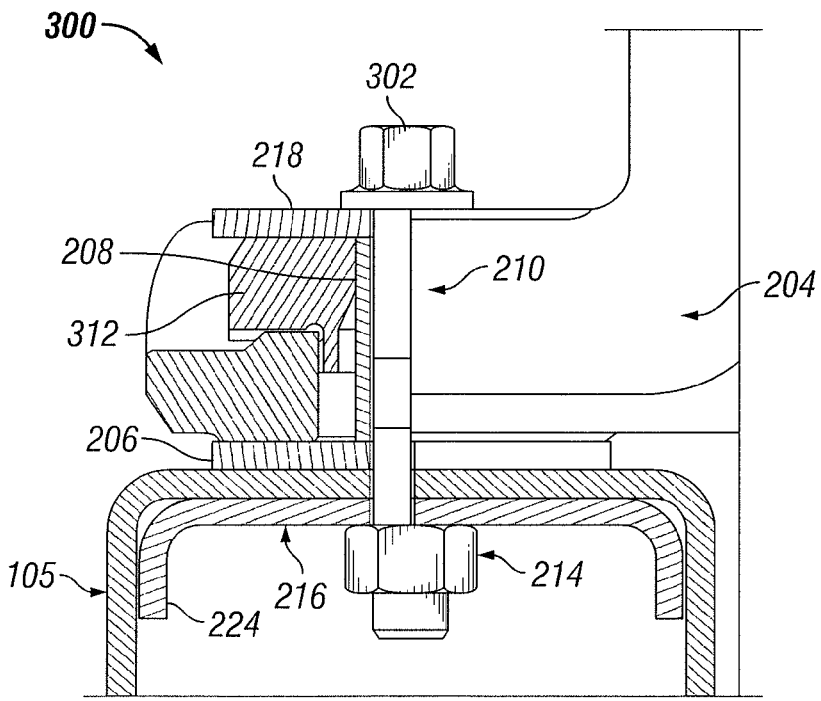
FIG. 3 is a partial cut-away view of an another embodiment slip joint mount.

Referring to FIG. 3, a further embodiment of a slip mount assembly 300 is depicted in partial section, where like reference numerals refer to like feature previously described. Assembly 300 includes a polymeric compression spring slip joint embodiment of slip mount assembly 300. Slip joint mount assembly 300 can be used instead of mount 112 in the equipment 100. In a specific, but non-limiting embodiment, the compression spring 312 is comprised of a resilient rubber mount with a flexible fabric. The compression spring 312 can be constructed of any polymer and/or polymeric material which is elastic or semi-elastic that allows an adequate amount of clamp load to be applied to the mount 300 while allowing thermal expansion to overcome the friction force of the preload from the compression spring 312 and, thereby allowing the equipment mount 204 to move relative to the base 105. Adequate torque, as utilized in reference to the slip joint mount assembly 300, refers to an amount of torque sufficient to retain the equipment mount 204 to the base 105 during normal use which can include transportation, seismic events, and/or vibration from the engine itself, among others.

The shim 206 allows for movement of the equipment mount 204 relative to the base 105. In a specific, non-limiting embodiment, the shim 206 is a slide shim 206. In some embodiments, the shim 206 is a polymeric or metallic spacer. It is contemplated that the shim 206 can be constructed in any manner such that the equipment mount 204 can move relative to the base 105 during thermal expansion of the prime mover 102.

In some embodiments of the present invention, a washer 218 is disposed between the equipment mount 204 and the compression spring 212, as is illustrated in FIG. 2. The washer 218 can be a hardened steel washer, polymeric washer, or any other washer that has a higher hardness than compression spring 212. In other embodiments, a washer 218 is disposed between the retention plate 302 and the compression spring 312, as is illustrated in FIG. 3. The washer 218 can be a snubbing washer or any other suitable washer to aid in uniformly compressing and or radially retaining the polymeric compression spring 312.

Referring now to FIG. 4, in one form, the base 105 is a skid 106 having a tubular hollow walled and/or hollow section construction. In further embodiments, it is contemplated that the base 105 can be a portion of a hull of a ship, a platform inside a locomotive, a flatbed of a truck, a floor of a trailer, or any other suitable device to which prime mover 102 can be mounted. A plurality of elongated hollow walled/section members, such as hollow beams, trusses, etc. can be utilized to form the skid 106. In one non-limiting embodiment, the skid 106 is composed of a plurality of steel beams having interior cavities. A plurality of third apertures 108 (such as cut-outs) can be disposed below the mounts 110, 112 to allow access to an underside of the second aperture 222. In one form, apertures 108 are in the form of cut-outs. The plurality of third apertures 108 can be sized such that a wrench or other tool can fit through to reach the nut retaining member 214. In other applications, the plurality of third apertures 108 can be larger to accommodate a retention assembly 216 which includes a flanged bracket 224 and a retaining member 214 that includes weld-nut attached to flanged bracket 224.

In certain embodiments, the retention assembly 216 is incorporated into (such as welded on) the flanged bracket 224 or can be joined thereto. In one non-limiting embodiment, the retention assembly 216 includes a retaining member 214 that is a nut 215 welded to a flanged bracket 224. The flanged bracket 224 is a plate including at least one flange which, when inserted inside the hollow walled skid 106 (such as through a side rail of a hollow section skid), prevents rotation of the retention assembly 216 when torque is applied to the fastening member 210 (e.g. through the bolt head). In other embodiments, the flanged bracket 224 can be of any construction to prevent rotation of the retention assembly 216. The retention assembly 216, which can include the flanged bracket 224 and welded nut 215, can be inserted into the third aperture 108 such that the nut 215 can receive the retainer 402 of the fastening member 210. After the nut 215 receives a portion of the retainer 402 of the fastening member 210, a single operator utilizing a single wrench can tighten the fastening member 210 to the desired torque as the flanged bracket 224 prevents rotation of the nut 215 with respect to fastening member 210. Additionally, a single wrench may be utilized to tighten the fastening member 210 over the life of the generator set should mount 110, 112 not have an adequate torque (e.g. due to engine vibration).

Figure 5:
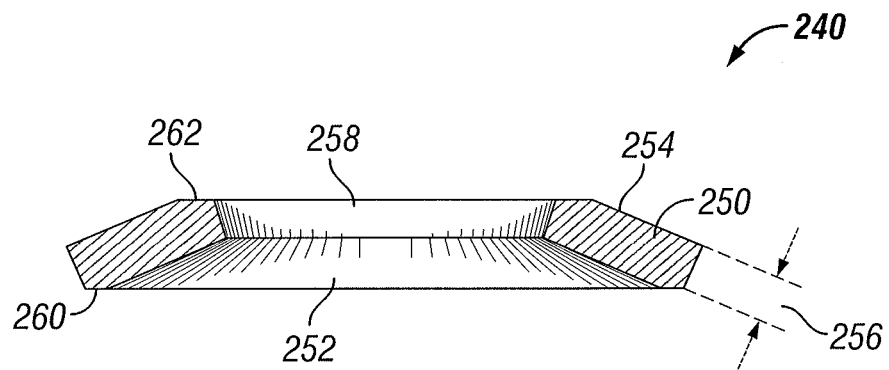
FIG. 5 is a sectional view of one embodiment of a conical spring washer type compression member.

Referring now to FIG. 5, a section view of the compression spring 212 in the form of a Belleville washer, also referred to as a spring washer, cone-shaped disc spring, or a conical spring washer 240, is shown. Conical spring washer 240 includes a body 250 defining a concave side 252 and an opposite convex side 254. Body 250 includes a thickness 256 between sides 252, 254, and a central aperture 258 opening at each of the sides 252, 254. Body 250 further defines a first contact flat 260 adjacent its perimeter around concave side 252 that provides a flat surface to stably contact an adjacent surface. Body 250 further includes a second contact flat 262 at convex side 254, and second flat 262 extends around and is adjacent to aperture 258 to provide a flat surface to stably contact an adjacent surface. The flat contact surfaces 260, 262 also move peak tensile stresses away from a contact point of spring washer 212 with the adjacent surface since loading is spread over a flat contact surface.

Conical spring washer 240 disclosed herein provides a non-flat washer having a spring characteristic useful for loading situations created by mounting generator set 101 and prime mover 102 on base 105, such as those involving vibration, thermal expansion, relaxation and bolt creep. The conical configuration enables a high load support capability of slip joint mount 112 with smaller heights and deflections than those provided by, for example, helical springs. Thus, conical spring washer 240 provides high load capacity in a relatively small space while reducing material costs compared to helical springs.

Conical spring washer 240 further provides the ability to achieve linear or non-linear regressive load deflection characteristics, compensate for different expansion rates in a joint while maintaining high tension in the joint, and act as a shock absorber or perform a dampening function. Furthermore, the deflection and load characteristics can be readily changed during set-up and maintenance by stacking these conical spring washers 240 in series, parallel, or series-parallel arrangements, such as shown in FIG. 6.

Figure 6:
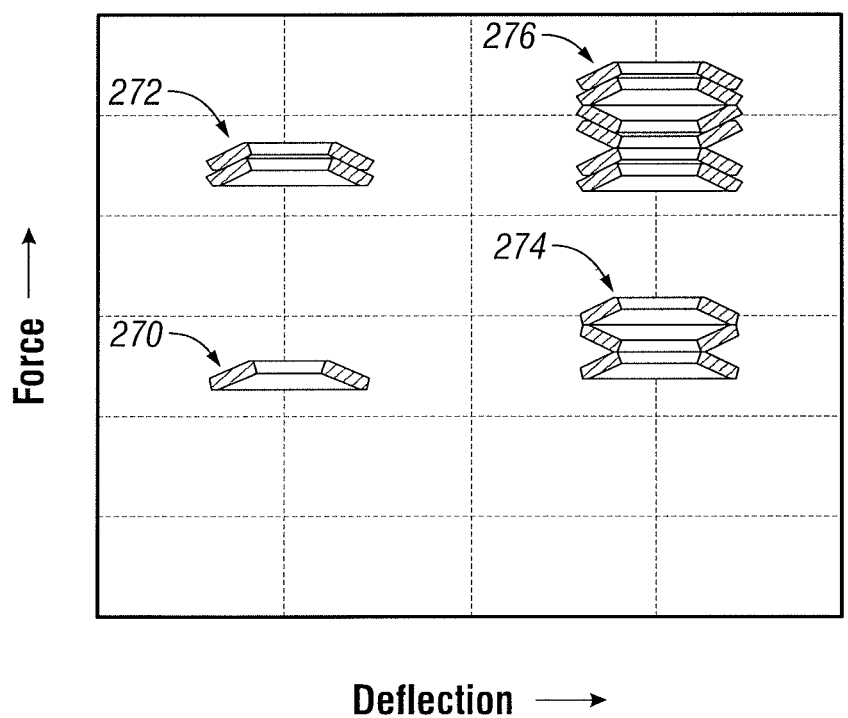
FIG. 6 is a diagram illustrating deflection and load carrying capabilities of various conical spring washer arrangements.

In FIG. 6, a load and deflection diagram is shown with a first compression spring arrangement 270 that includes a single conical spring washer 240 providing a first load carrying capability and a first deflection capability. A second compression spring arrangement 272 includes a series of two conical spring washers 240 that are stacked in a nested relationship with the concave side 252 of one spring washer 240 receiving the convex side of the adjacent spring washer 240 to increase the load carrying capability while maintaining the first deflection capability.

A third compression spring arrangement 274 includes a parallel positioning of three compression spring washers 240 with convex sides 254 of two compression spring washers 240 contacting one another and concave sides 252 of the third spring washer and one of the two other spring washers facing one another. The third arrangement 274 increases the deflection capability of the spring washers 240.

A fourth compression spring arrangement 276 includes a combination of parallel and series arrangements formed by adding a second spring washer 240 in a series arrangement with each of the parallel spring washers 240 of third arrangement 274 to increase load carrying capability while maintaining the deflection capability. Further adjustability in load carrying capability and deflection capability can be achieved by using conical spring washers 240 having different thicknesses 256. Thus, conical spring washers 240 can provide a large number of adjustments in height and spring rate tuning while consuming relatively little space in the slip joint mount 112. The serviceability of the slip joint mount 112 employing conical spring washers 240 is improved since transportation and storage of spring washers 240 is more readily achieved than would be created by an inventory of coil springs providing a similar range of load carrying capabilities and deflection capability.

Figure 7:
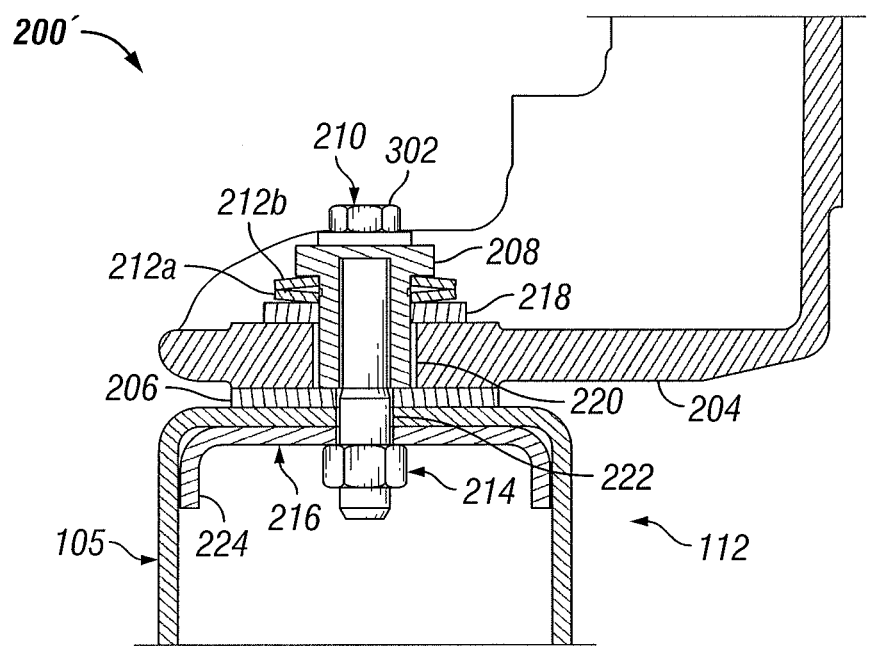
FIG. 7 is a partial cut-away view of another embodiment slip joint mount.

Referring to FIG. 7, another embodiment 200' of the slip joint mount assembly is shown in a partial cut-away view, with elements common to those of slip joint mount assembly 200 designated with the same reference numerals. Slip joint assembly 200' includes two conical spring washers 240a, 240b positioned in a parallel arrangement with concave sides 252 facing one another. In another embodiment, two conical spring washers 240a, 240b are arranged in series in a nested relationship with a concave side of one spring washer 240a, 240b receiving the convex side of the other spring washer 240a, 240b. In still another embodiment, spring washers 240a, 240b are positioned with convex sides 254 in contact with one another.

Figure 8:
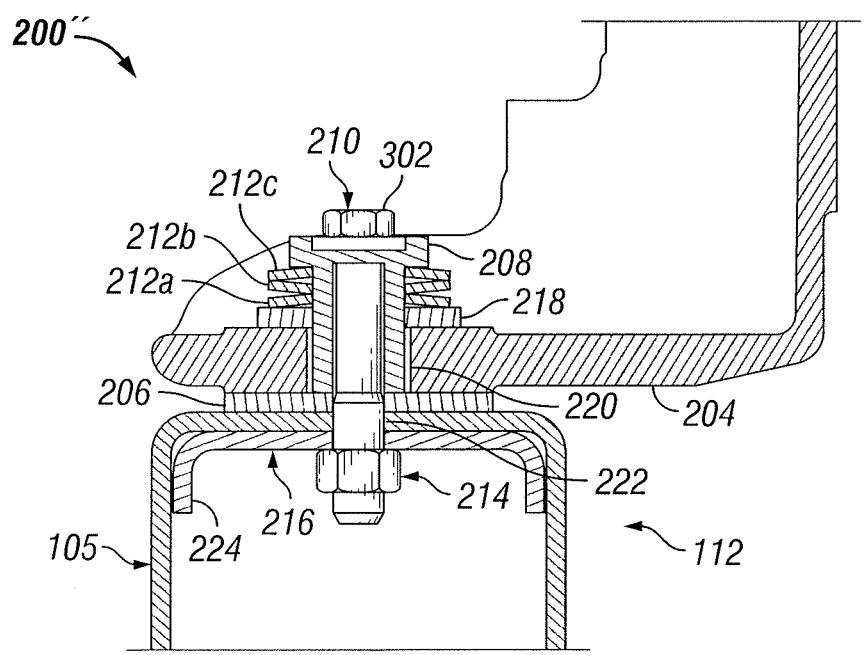
FIG. 8 is a partial cut-away view of another embodiment slip joint mount.

Referring to FIG. 8, another embodiment 200" of the slip joint mount assembly is shown in a partial cut-away view, with elements common to those of slip joint mount assembly 200 designated with the same reference numerals. Slip joint assembly 200" includes three conical spring washers 240a, 240b, 240c positioned in a series-parallel arrangement with convex sides 254 of spring washers 240a, 240b positioned in contact with one another and with spring washers 240b, 240c positioned in contact with one another with concave sides 252 facing one another. Other embodiments contemplate other arrangements, such as those discussed above with respect to FIG. 6 and still others as would occur to those skilled in the art with the benefit of this disclosure.

One exemplary embodiment disclosed herein is an apparatus, including an electric power generator and a mover prime mover to drive the generator, the prime mover including a first mounting aperture and being comprised of a first material having a first thermal coefficient of expansion. The apparatus further includes a base including a second mounting aperture and being comprised of a second material having a second thermal coefficient of expansion different than the first thermal coefficient of expansion. The apparatus further includes at least one of the first aperture and the second aperture being sized to accommodate displacement between the prime mover and the base caused by a difference between the first thermal coefficient of expansion and the second coefficient of expansion. The apparatus further includes a slip joint mount to connect the prime mover and the base over a range of the displacement, the slip joint mount including a compression spring and a fastening member extending through the first mounting aperture, the second mounting aperture, and the compression spring, the fastening member being secured to exert a compressive force on the compression spring to maintain the connection between the prime mover and the base over the range of displacement.

In some embodiments, the fastening member includes a threaded end portion opposite a head, and further includes a threaded nut to secure the fastening member. In some embodiments, the first material is steel and the second material is iron. In some embodiments, the base is a form of a skid including a tubular support member defining the second aperture and the fastening member includes a threaded end portion that engages a retention assembly within the support member. In some embodiments, the retention assembly includes a nut secured to a flange member shaped to prevent rotation of the nut within the support member as the fastening member is engaged to the nut.

Yet another exemplary embodiment is an apparatus, including an electric power generator and a prime mover to drive the generator, the prime mover including a first mounting aperture. The apparatus further includes a base including an elongate support member, the support member defining a second mounting aperture opening into a hollow interior space defined by the support member. The apparatus further includes a prime mover mounting mechanism to connect the prime mover and the base, the prime mover mounting mechanism including a fastening member sized and shaped to extend through the first mounting aperture and the second mounting aperture, the fastening member including a threaded end portion opposite a head, and a retention assembly including a threaded passage structured to receive the threaded end portion of the fastening member and a projection extending outwardly from the threaded passage, the projection being configured to contact the support member and align the threaded passage with the second aperture in the hollow interior space of the support member and to prevent rotation of the retention assembly when the threaded end portion of the fastening member is threadingly engaged to the threaded passage to secure the prime mover to the base.

In some embodiments, the apparatus further includes a compression spring such as a Belleville washer, the fastening member extending through the compression spring, the first aperture, the second aperture, and in threaded engagement with the threaded passage to exert a compressive force on the compression spring to accommodate displacement caused by a difference in thermal coefficient of expansion between the prime mover and the base. In some embodiments, the threaded member is a type of bolt, the base is a type of skid including a number of metallic support members, and the retention assembly defines a form of slip joint mount for the prime mover.

Yet another exemplary embodiment includes an apparatus, including a prime mover to drive an electric power generator. The apparatus further includes an prime mover mount, including a first mounting aperture, engaged to the prime mover. The apparatus further includes a base including a second mounting aperture and a shim positioned between the prime mover mount and the base. The apparatus further includes a sleeve configured to receive a fastening member, the sleeve received in the first mounting aperture. The apparatus further includes a fastening member, including a retention plate at a first end and a retainer at a second end, extending through the sleeve, the shim and the second mounting aperture. The apparatus further includes a compression spring positioned between the retention plate and the prime mover mount and a retention assembly structured coupled to the retainer.

In some embodiments, the compression spring is selected from the group of compression springs consisting of a conical spring washer, a helical spring, a leaf spring, and an elastomeric spring. In some embodiments, the sleeve further comprises a T-shaped bushing, wherein a flange of the bushing is located between the retention plate and the compression spring. In some embodiments, the base is a skid, and the generator is coupled to the skid. In further embodiments, a fixed prime mover mount is coupled to the prime mover and the skid at a location toward the generator.

In further embodiments, the base further comprises a skid and wherein the retainer further includes a threaded portion and the retention assembly further includes a bracket, including a flange, configured to be received within a portion of the skid, a second threaded portion coupled to the bracket and configured to receive the threaded portion of the retainer, and the flange is configured to prevent rotation of the bracket while the retainer is being mated to the second threaded portion. In some embodiments, the fastening member is a bolt, the retention plate is a bolt head, and the second threaded portion further comprises a nut. In yet further embodiments, a washer is located between at least one of the compression spring and the prime mover mount, and the retention plate and the compression spring, and the fastening member extends through the washer.

Yet another exemplary embodiment is a system, including an prime mover mount, including a first mounting aperture, engaged to a prime mover operably coupled to drive a generator. The system further includes a base including a second mounting aperture and a bushing extending through a portion of the first mounting aperture. The system further includes a shim positioned between the prime mover mount and the base. The system further includes a fastening member having a first end adjacent a compression spring, extending through the compression spring, the bushing, the shim and the second mounting aperture. The system further includes a retention assembly configured to receive a threaded portion of the bolt.

In some embodiments, the base further includes a skid configured to receive the retention assembly, the retention assembly further includes a flanged plate, and the flanged plate includes a second threaded portion. In further embodiments, the skid further includes a plurality of semi-rectangular hollow members including a plurality of third apertures disposed along a side of the semi-rectangular hollow members. In further embodiments, the compression spring is at least one of a conical spring washer, a helical spring, a leaf spring, and an elastomeric spring. In yet further embodiments, the prime mover includes a prime mover block constructed of a material having a first thermal coefficient of expansion, the skid is constructed of a material having a second thermal coefficient of expansion, and the first thermal coefficient of expansion and the second thermal coefficient of expansion are unequal.

In some embodiments, the prime mover further includes an internal combustion engine. In further embodiments, the system includes a washer located between at least one of the compression spring and the prime mover mount, and the bolt head and the compression spring, and wherein the bolt extends through the washer.

Yet another exemplary embodiment is an apparatus, including an electric generator driven by a prime mover mount operably coupled to the prime mover, a base including a mounting aperture, means for retaining the prime mover mount to the mounting aperture, and means for allowing for movement of the prime mover mount with respect to the mounting aperture due to thermal expansion of a portion of the prime mover. In some embodiments, means for retaining the prime mover mount to the mounting aperture includes means for preventing rotation of the means for retaining during at least one of installation and tightening. In some embodiments, the prime mover is an internal combustion engine.

Yet another exemplary embodiment is a method, including providing a prime mover including a first mounting aperture and a base including a second mounting aperture. The method further includes mechanically coupling an electric power generator to the prime mover, the prime mover operable to drive the generator. The method further includes extending a fastening member through a compression spring, the first mounting aperture, and the second mounting aperture. The method further includes securing the fastening member to exert a compressive force on the compression spring.

In some embodiments, the method includes positioning a shim between the first mounting aperture and the second mounting aperture and extending the fastening member through the shim. In some embodiments, securing the fastening member further includes inserting a retention assembly, having a flange, through a third aperture into a hollow interior space of the base, aligning a threaded portion of the retention assembly with the second aperture, and rotating a head portion of the fastening member, thereby threading a portion of the fastening member into the threaded portion of the retention assembly.

In some embodiments of the systems and methods disclosed herein, the slip joint assembly includes at least two conical spring washers stacked one upon the other. In a refinement of this embodiment, the at least two conical spring washers are stacked one upon the other with concave sides facing one another. In another refinement of this embodiment, the at least two conical spring washers are stacked one upon the other with a concave side of one spring washer positioned against a convex side of the other spring washer. In yet another refinement of this embodiment, the at least two conical spring washers comprises at least three conical spring washers, and two of the spring washers are stacked on upon the other with concave sides facing one another, and a third spring washer is stacked on one of the two spring washers with convex sides thereof against one another.

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that any use of the word preferable, preferably, or preferred in the description above indicates that feature so described can be more desirable, it nonetheless may not be necessary and any embodiment lacking the same can be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item can include a portion and/or the entire item unless specifically stated to the contrary.

What is claimed is:

1. An apparatus, comprising:
an electric power generator;
a prime mover to drive the generator, the prime mover including a first mounting aperture and being comprised of a first material having a first thermal coefficient of expansion;
a base including a second mounting aperture and being comprised of a second material having a second thermal coefficient of expansion different than the first thermal coefficient of expansion, at least one of the first aperture and the second aperture being sized to accommodate displacement between the prime mover and the base caused by a difference between the first thermal coefficient of expansion and the second coefficient of expansion;
a slip joint mount to connect the prime mover and the base over a range of the displacement of the prime mover relative to the base, the slip joint mount including:
at least one compression washer; and
a fastening member extending through the first mounting aperture, the second mounting aperture, and the compression washer, the fastening member being secured to exert a compressive force on the compression washer to maintain the connection between the prime mover and the base over the range of displacement.

2. The apparatus of claim 1, wherein:
the compression washer is a conical spring washer; and
the fastening member includes a threaded end portion opposite a head, and further comprising a threaded nut to secure the fastening member.

3. The apparatus of claim 1, wherein the first material is steel and the second material is iron.

4. The apparatus of claim 1, wherein the base is a skid including a plurality of tubular support members at least one of which defines the second aperture and the fastening member includes a threaded end portion that engages a retention assembly within the support member.

5. The apparatus of claim 4, wherein the retention assembly includes a nut fixed to a flange member, the flange member configured to contact the support member and prevent rotation of the nut relative to the support member as the fastening member is threadingly engaged with the nut.

6. The apparatus of claim 1, wherein the prime mover is an internal combustion engine.

7. The apparatus of claim 1, wherein the compression washer includes at least two compression washers stacked one upon the other.

8. The apparatus of claim 7, wherein each of the compression washers includes a concave side and a convex side opposite the concave side.

9. The apparatus of claim 8, wherein the at least two compression washers are stacked one upon the other with the concave sides facing one another.

10. The apparatus of claim 8, wherein the at least two compression washers are stacked one upon the other with the concave side of a first compression washer positioned against a convex side of the adjacent compression washer.

11. The apparatus of claim 8, wherein the at least two compression washers comprises at least three compression washers, and two of the compression washers are stacked on upon the other with the concave sides facing one another, and a third compression washer is stacked on one of the two compression washers with the convex side thereof against the convex side of the one of the two compression washers.

12. The apparatus of claim 7, wherein each of the compression washers includes a first flat contact surface around the concave side and a second flat contact surface around an opening of a central aperture on the convex side.

13. An apparatus, comprising:
an electric power generator;
a prime mover to drive the generator, the prime mover including a first mounting aperture;
a base including an elongate support member, the support member defining a second mounting aperture intersecting a hollow interior space defined by the support member;
a mounting mechanism to connect the prime mover and the base, the mounting mechanism including:
a fastening member sized and shaped to extend through the first mounting aperture and the second mounting aperture, the fastening member including a threaded end portion; and
a retention assembly including a threaded passage structured to receive the threaded end portion of the fastening member and a projection extending outwardly from the threaded passage, the projection being sized and shaped to align the threaded passage with the second aperture in the hollow interior space of the support member while in engagement with the support member to prevent rotation of the retention assembly when the threaded end portion of the fastening member is threadingly engaged to the threaded passage to secure the prime mover to the base.

14. The apparatus of claim 13, further comprising a compression spring, the fastening member extending through the compression spring, the first aperture, and the second aperture, and threadingly engaging the threaded passage to exert a compressive force on the compression spring to accommodate displacement caused by a difference in thermal coefficient of expansion between the prime mover and the base.

15. The apparatus of claim 14, wherein the threaded member is a bolt, the compression spring is a conical spring washer, the base is a skid including a number of support members, and the retention assembly defines a slip joint mount for the prime mover to the base.

16. The apparatus of claim 13, wherein the prime mover is an internal combustion engine.

17. An apparatus, comprising:
a prime mover to drive an electric power generator;
a prime mover mount, including a first mounting aperture, engaged to the prime mover;
a base including a second mounting aperture;
a shim positioned between the prime mover mount and the base;
a sleeve extending at least partially through the first mounting aperture;
a fastening member, including a retention plate at a first end and a retainer at a second end, extending through the sleeve, the shim and the second mounting aperture;
a compression spring positioned between the retention plate and the prime mover mount; and
a retention assembly engaged to the base that is coupled to the retainer to compressively engage the compression spring between the retention plate and the prime mover mount and secure the prime mover to the base.

18. The apparatus of claim 17, wherein the compression spring is selected from the group of compression springs consisting of a conical spring washer, a helical spring, and an elastomeric spring.

19. The apparatus of claim 17, wherein the sleeve further comprises a T-shaped bushing, wherein an end flange of the bushing is located between and in contact with the retention plate and the compression spring.

20. The apparatus of claim 17, wherein the base is a skid, and wherein the generator is mounted to the skid.

21. The apparatus of claim 20, further comprising a fixed prime mover mount operably coupled to the prime mover and the skid at a location toward the generator.

22. The apparatus of claim 21, wherein the prime mover is an internal combustion engine.

23. The apparatus of claim 17, wherein:
the base further comprises a skid;
the retainer of the fastening member further comprises a threaded portion; the retention assembly further comprises:
a bracket, including a flange, configured to be received within a portion of the skid;
the bracket including a receiving portion configured to threadingly receive the threaded portion of the retainer; and
wherein the flange is configured to contact the skid and prevent rotation of the bracket while the retainer is threadingly engaged to the receiving portion of the bracket.

24. The apparatus of claim 23, wherein the fastening member is a bolt, wherein the retention plate is a bolt head, and wherein the receiving portion includes a nut fixed to the bracket.

25. The apparatus of claim 17, further comprising at least one washer located between the compression spring and the prime mover mount, and wherein the fastening member extends through the washer.

26. A system, comprising:
- a prime mover mount, including a first mounting aperture, coupled to a prime mover, the prime mover operably coupled to drive a generator;
- a base including a second mounting aperture;
- a bushing extending through a portion of the first mounting aperture;
- a shim positioned between the prime mover mount and the base;
- at least one compression spring between a portion of the bushing and the prime mover mount;
- a fastening member extending through the compression spring, the bushing, the shim and the second mounting aperture; and
- a retention assembly configured to receive and couple the fastening member to the base with an opposite end of the fastening member compressively engaging the bushing and the compression spring.

27. The system of claim 26, wherein the base further comprises a skid configured to receive the retention assembly, the retention assembly further comprising a flanged plate, and wherein the flanged plate includes a second threaded portion.

28. The system of claim 27, wherein the skid further comprises a plurality of semi-rectangular hollow support members including a plurality of third apertures disposed along a side of the support members.

29. The system of claim 28, wherein the compression spring is at least one of a conical spring washer, a helical spring, and an elastomeric spring.

30. The system of claim 29, further comprising:
- wherein the prime mover includes an engine block constructed of a material having a first thermal coefficient of expansion;
- wherein the skid is constructed of a material having a second thermal coefficient of expansion; and
- wherein the first thermal coefficient of expansion and the second thermal coefficient of expansion are unequal.

31. The system of claim 26, further comprising a fixed mount located toward the generator that couples the prime mover to the base.

32. The system of claim 26, further comprising a washer located between the compression spring and the prime mover mount, wherein the fastening member extends through the washer.

33. The system of claim 26, wherein the prime mover is an internal combustion engine.

34. The system of claim 26, wherein the at least one compression spring includes a plurality of conical spring washers stacked one upon another.

35. The system of claim 34, wherein at least two of the conical spring washers are stacked in a nested relationship with a concave side of one conical spring washer receiving a convex side of the other conical spring washer to increase a load carrying capability of the stack of conical spring washers.

36. The system of claim 34, wherein at least two of the conical spring washers are stacked in a facing relationship with a concave side of one conical spring washer facing a concave side of the other conical spring washer to increase a deflection capability of the stack of conical spring washers.

37. An apparatus, comprising:
- an electric generator driven by a prime mover;
- an prime mover mount operably coupled to the prime mover;
- a base including a mounting aperture;
- means for retaining the prime mover mount to the mounting aperture; and means for allowing for movement of the prime mover mount with respect to the mounting aperture during thermal expansion of a portion of the prime mover, wherein the means for retaining and the means for allowing movement include a compression washer.

38. The apparatus of claim 37, wherein means for retaining the prime mover mount to the mounting aperture further includes means for preventing rotation of a retention member retaining means that threadingly receives a portion of a fastening member of the retaining means during at least one of installation and tightening of the fastening member.

39. The apparatus of claim 37, wherein the prime mover is an internal combustion engine.

40. A method, comprising:
- providing a prime mover including a first mounting aperture and a base including a second mounting aperture;
- mechanically coupling an electric power generator to the prime mover, the prime mover operable to drive the generator;
- extending a fastening member through at least one compression spring, the first mounting aperture, and the second mounting aperture; and
- securing the fastening member to exert a compressive force on the compression spring.

41. The method of claim 40, further comprising:
- positioning a slidable shim between the first mounting aperture and the second mounting aperture and extending the fastening member through the slidable shim.

42. The method of claim 40, wherein securing the fastening member further comprises:
- inserting a retention assembly, having a flange, through a third aperture of the base and into a hollow interior space of the base;
- aligning a threaded portion of the retention assembly with the second aperture; and
- rotating the fastening member to thread a portion of the fastening member into the threaded portion of the retention assembly while the retention assembly contacts the base to prevent rotation of the threaded portion.

43. The method of claim 40, wherein the prime mover is an internal combustion engine.

44. The method of claim 40, wherein the at least one compression spring includes at least two conical spring washers stacked one upon the other.

45. The method of claim 44, wherein the at least two conical spring washers are stacked one upon the other with concave sides facing one another.

46. The method of claim 44, wherein the at least two conical spring washers are stacked one upon the other with a concave side of one spring washer positioned against a convex side of the other spring washer.

47. The method of claim 44, wherein the at least two conical spring washers comprises at least three conical spring washers, and two of the spring washers are stacked on upon the other with concave sides facing one another, and a third spring washer is stacked on one of the two spring washers with convex sides thereof against one another.

* * * * *